(No Model.)
A. MULLISON.
UTENSIL.
No. 581,869. Patented May 4, 1897.
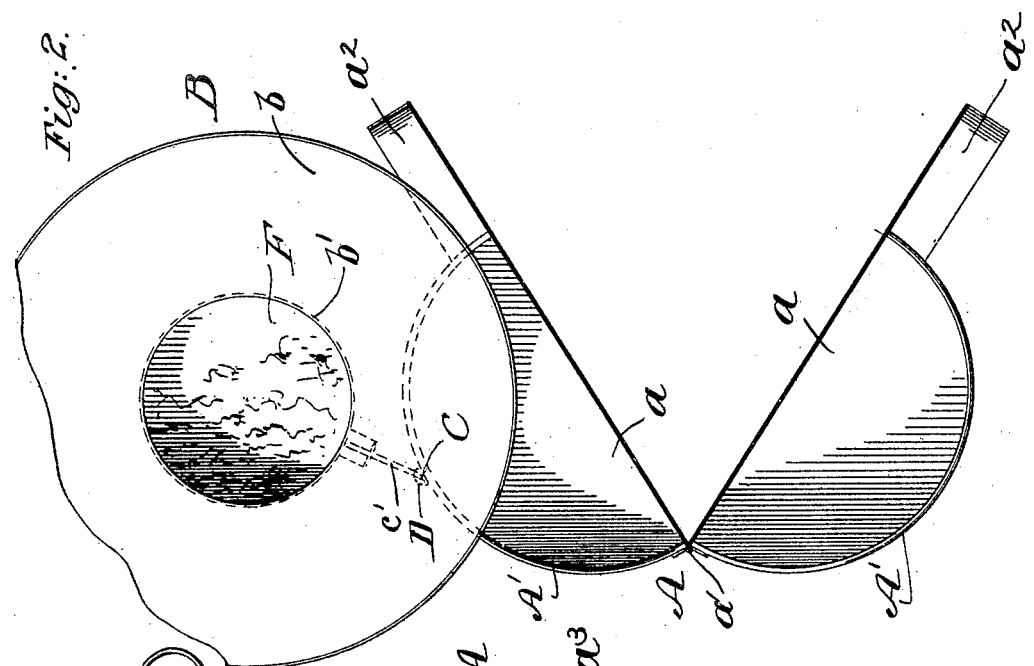
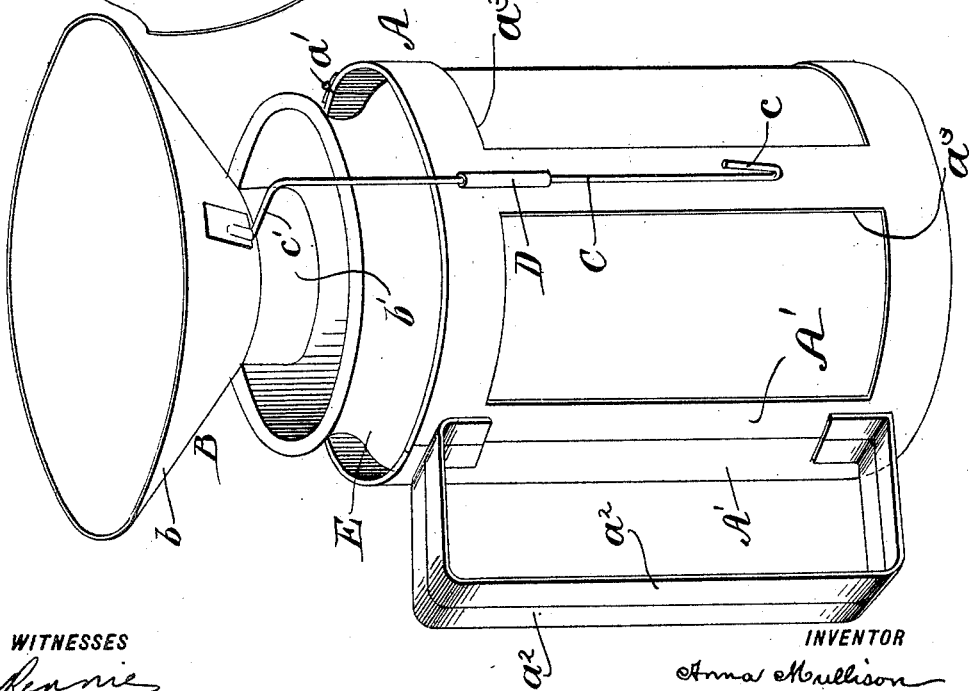
WITNESSES
INVENTOR
Anna Mullison
BY
ATTORNEYS

UNITED STATES PATENT OFFICE.

ANNA MULLISON, OF ROSEVILLE, NEW JERSEY.

UTENSIL.

SPECIFICATION forming part of Letters Patent No. 581,869, dated May 4, 1897.

Application filed July 18, 1896. Serial No. 599,651. (No model.)

*To all whom it may concern:*

Be it known that I, ANNA MULLISON, a citizen of the United States, and a resident of Roseville, county of Essex, and State of New Jersey, have invented certain new and useful Improvements in Utensils, of which the following is a specification, reference being had to the accompanying drawings, forming a part thereof, in which similar letters of reference indicate corresponding parts.

This invention relates to an improvement in utensils for filling and handling fruit-jars, the object of the invention being to provide an efficient device of this character which facilitates the work of canning fruit, whereby a user can fill and carry full hot jars from place to place without danger of injuring the fingers by contact with the jars.

The device is simple in construction, durable, and inexpensive.

The invention will be hereinafter fully described, and specifically set forth in the annexed claim.

In the accompanying drawings, forming part of this specification, Figure 1 is a perspective view of my improved utensil, illustrating the same with a jar contained therein; and Fig. 2 is a plan view thereof, showing the same open for releasing the jar.

In the practice of my invention I provide a cylindrical casing A. This said casing comprises two semicircular sections A', having semicircular bottom or base portions $a$ connected thereto. These said sections are connected to each other by hinges $a'$, and they are provided, respectively, with handles $a^2$. To lighten the structure, the sections A' may have apertures $a^3$ therethrough. The device is further supplied with a funnel B, which comprises a body $b$ and a stem $b'$. This said funnel is attached to one of the sections A' by means of a rod C, which said rod engages with a sleeve D, secured in vertical position to one of the sections A'. This said rod has a handle $c$ upon the lower end thereof and an extended arm $c'$ upon the upper end thereof. This said arm is securely attached to the funnel-body.

In the operation of the device any suitable jar E will be clamped therein, as illustrated in Fig. 1 of the drawings. The funnel will then be placed over the center thereof, whereby any suitable matter to be preserved can be poured therein until the jar is filled. After it is filled an operator will swing the funnel around to a position approximating that shown in Fig. 1, and a cork F will be inserted within the stem thereof to prevent dripping. The casing A will then be opened to a sufficient extent to release the jar, and said jar can be placed in any suitable location without the necessity of an operator handling the same direct, whereby hot jars can be conveniently moved from one place to another.

I do not confine myself to the specific construction as herein shown and described, as it is obvious that under the scope of my invention I am entitled to slight variations of structure.

Having thus described my invention, what I claim as new, and desire to secure by Letters Patent, is—

In a kitchen utensil adapted for handling and filling fruit-jars, a cylindrical casing composed of two apertured hinged sections, each section being provided with a semicircular bottom portion and handle; a swinging funnel provided with a stopper, and means for connecting the funnel to one of the sections, substantially as shown and described.

In testimony that I claim the foregoing as my invention I have signed my name, in presence of two witnesses, this 16th day of July, 1896.

ANNA MULLISON.

Witnesses:
C. SEDGWICK,
O. C. WINGE.